Figure 1:
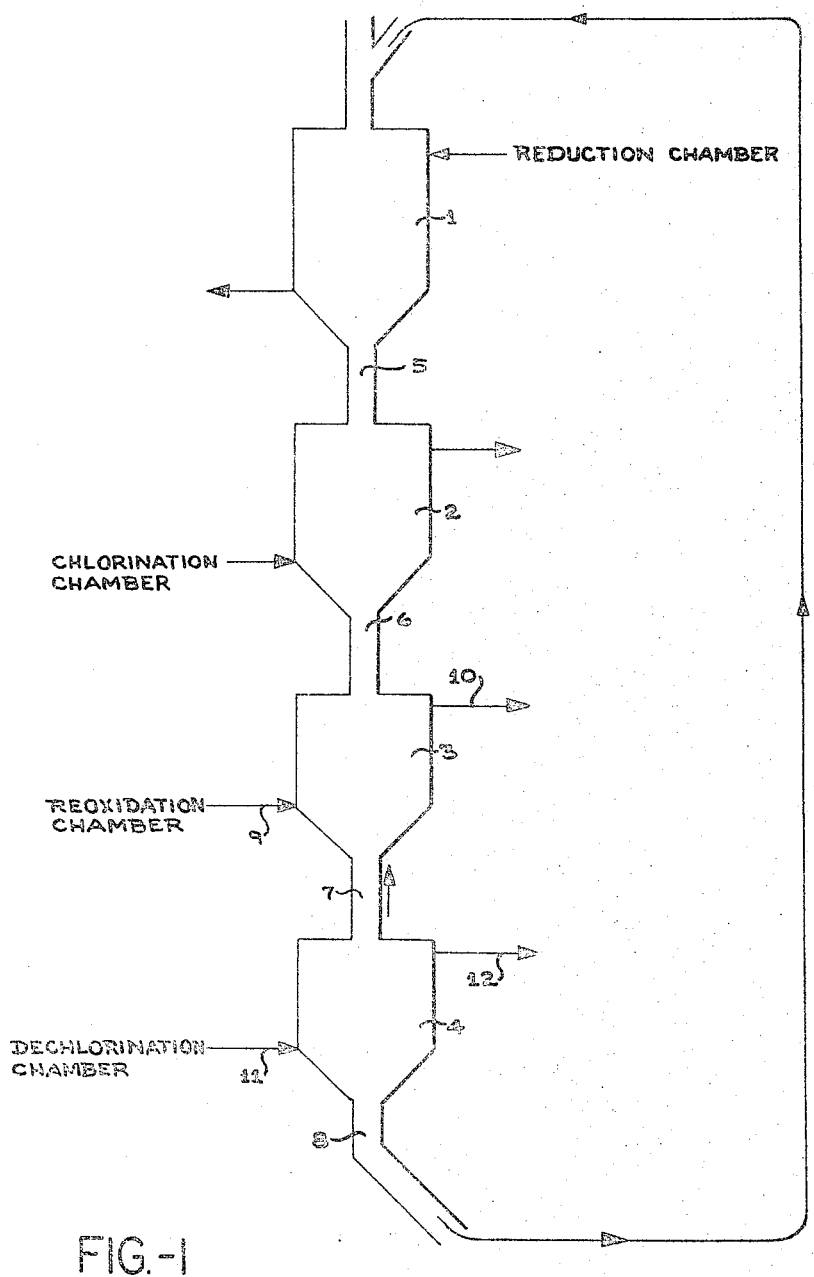

3,332,742
PROCESS FOR THE MANUFACTURE
OF CHLORINE
Paul Metaizeau, Dombasle, France, assignor to
Solvay & Cie, Brussels, Belgium
Filed Dec. 26, 1963, Ser. No. 333,746
Claims priority, application France, Jan. 14, 1963,
921,303
4 Claims. (Cl. 23—219)

The present invention relates to an improved process for the manufacture of chlorine from hydrogen chloride and/or ammonium chloride.

The manufacture of chlorine by the alternate chlorination and oxidation of polyvalent metal oxides is known. Processes of this type include, first, passing hydrogen chloride and/or ammonium chloride over reaction masses containing metal oxides in order to form the corresponding metal chlorides, then subjecting these metal chlorides to oxidation by means of air, or oxygen-containing gas, to liberate chlorine.

When iron oxides are used, the fundamental reactions that take place in the above operation are represented by the following equations:

$$2Fe_2O_3 + 12HCl \rightarrow 4FeCl_3 + 6H_2O$$
$$4FeCl_3 + 3O_2 \rightarrow 2Fe_2O_3 + 6Cl_2$$

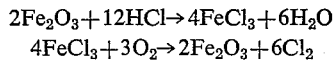

In practice, it is difficult to obtain high yields and chlorine of high concentration, since at the temperatures necessary for the oxidation of ferric chloride, the latter is quite volatile with the result that it is partially eliminated from the reaction zone before it can react. This difficulty can be largely eliminated by employing reaction masses containing, in addition to the ferric chloride, an alkali chloride such as potassium chloride which serves the purpose of reducing the volatility of the ferric chloride, a reaction promoter such as a chloride of cadmium or copper, all incorporated into a suitable inert support.

Higher yields are obtained by carrying out the successive chlorination and oxidation reactions with the aid of moving beds of the reactant masses.

The reactant masses circulate through the installation in a descending direction through superimposed chlorination and oxidation chambers, where they meet in countercurrent flow respectively hydrogen chloride, or ammonium chloride, and an oxygen-containing gas. By recycling continuously the reactant masses good yields can be obtained even if the percentage of conversion at each passage is relatively low.

The yield of the chlorination reaction can be increased and the general operating conditions improved by introducing into the above cycle a third reaction stage, in which the oxides are reduced to a stage of lower valence by means of a reducing gas, such as hydrogen, circulating in the same direction as the direction of flow of the moving reactant masses.

A process of the above type can be carried out by causing the reactant masses to circulate, in moving beds, through three superimposed vessels where the three successive reactions corresponding to the three stages of the process are carried out, namely: reduction, chlorination and oxidation.

Although this improved process under certain cases has permitted the production of gaseous mixtures containing a chlorine content of in excess of 20%, it is generally difficult under industrial conditions to obtain inexcess of 10%. In fact, although it is desirable to push the chlorination of the reactant masses as far as possible, an increase in the rate of the chlorination can cause difficulties in the operation, such as, plugging in the installation, a decrease in the chlorination yield and increased losses of the active elements of the reactant masses. It is then necessary, in order to assure the satisfactory functioning of an industrial installation, to reduce the rate of chlorination of the reactant masses, and consequently the chlorine content of the gases leaving the oxidation zone.

Applicant has found that it is nevertheless possible to obtain a gas of higher chlorine content by modifying the circulation of the gases in the middle of the moving oxidation bed.

The improved process, according to the present invention, consists of manufacturing a gas of high chlorine content by contacting hydrogen chloride and/or ammonium chloride, with moving beds of reactant masses comprising inert granular supports, such as diatomaceous earth, impregnated with chlorides or oxides of iron, an alkali chloride, such as potassium chloride, and a promoter such as cadmium or copper chloride, said moving beds falling by gravity through the superimposed reaction vessels in which the reduction, chlorination, and oxidation of the reactant masses are effected, and in which the oxidation of the reactant masses takes place in two stages, including first a reoxidation of the impregnated salts to the state of their maximum valence, followed by an oxidative dechlorination of these salts, with liberation of chlorine.

The cyclic process is accomplished in practice by circulation of the reactant masses in a moving bed through four superimposed vessels where the different reactions corresponding to the successive stages of the process are effected, namely:

(1) reduction of the metal chlorides and oxides by a reducing gas such as hydrogen, water gas, or illuminating gas, circulating in parallel with the reactant masses;
(2) chlorination of the reduced granules, resulting from the preceding operation, with vapors of hydrogen chloride and/or ammonium chloride circulating countercurrent-wise to the direction of flow of the reactant masses;
(3) reoxidation of the chlorinated granules to their state of maximum valence;
(4) oxidative dechlorination of the granules from the preceding step, with the liberation of chlorine and transformation of the chlorides into oxides, the granules thus oxidized being returned to the reduction stage.

The four superimposed vessels are connected with pipes permitting the passage of the granules but not the gas. Each of these vessels is filled with its own particular gas which is not permitted to flow into the other vessels.

The oxidized reactant masses leaving the lower vessel are recycled to the upper part of the installation by an elevator arrangement of suitable type such as an air-lift, mass-lift, mechanical elevator, etc.

The ammonia incidentally present during the chlorination can form complexes with the metal chlorides, and hence a washing of the granules by an inert gas can be provided to recover this ammonia.

The reactant masses comprise an inert support, such as for example diatomaceous earth, impregnated with ferric chloride, in a proportion by weight between about 0.1 and 0.5. The molecular ratio of $KCl/FeCl_3$ is preferably equal to or greater than 1, for example 1.25. The quantity of promoter can vary between wide limits, but the best results are generally obtained with a molecular ratio of promoter/FeCl₃ of 0.1 to 0.3. Copper chloride is preferably used as the promoter.

The reactant masses are, in general, identical to those used in the cyclic process utilizing only three reaction stages, but the chlorine content of the gaseous products of the oxidization zone is in this case decidedly lower.

When, in a complex process comprising three stages including reduction, chlorination, and oxidation, the oxidation is effected in a single step, the complete oxidation reaction can be represented by the following equation:

$$4FeCl_2 + 3O_2 \rightarrow 2Fe_2O_3 + 4Cl_2$$

The oxidation agent being air, considerable quantities of nitrogen, brought into the oxidation zone with the oxygen, cause the dilution of the chlorine product. The chlorine content of the gas leaving this single oxidation zone therefore seldom exceeds 10%, under industrial conditions.

It has now been found that the complete oxidation reaction is in reality the combination of two reactions, namely the reoxidation of the salts to the highest valence state and the oxidative dechlorination of these salts with the liberation of chlorine, and that these two reactions can be effected separately:

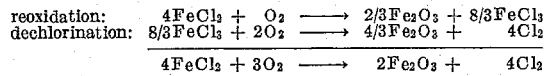

A third of the oxygen consumed in the complete oxidation step does not serve to liberate chlorine, but instead to reoxidize, to their state of highest valence, the salts reduced in the reduction zone.

The present invention comprises effecting the two distinct oxidation reactions separately in two different zones in the presence of different currents of gas: first, a reoxidization zone for the salts without the liberation of chlorine, into which is injected about one-third of the total quantity of the oxygen required for the complete oxidation operation, and from which the nitrogen is removed practically free from chlorine. The thus treated reactant masses are then passed into a second oxidative dechlorination zone into which is injected the remaining required oxygen, i.e., two-thirds of the total quantity required for the complete oxidation operation, and in which the chlorine is produced diluted with very small quantities of nitrogen.

In practice, the reaction chamber where the oxidation reaction is effected is replaced by two vessels of smaller dimensions, connected by a tube of convenient size permitting the passage of the reactant granules. Into each chamber are introduced separate currents of gas. The granules leaving the chlorination zone, and in which the active constituents are in the state of reduced chlorides, pass first to the reoxidation vessel. On leaving the latter in the form of oxidized chlorides, they descend, by gravity, into the dechlorination vessel where the chlorides are transformed into oxides with the production of chlorine.

According to one interesting variation of the invention, use is made of chlorine and not more than enough oxygen to effect the reoxidation of the granules:

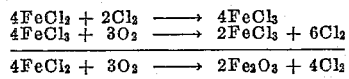

It has, in fact, been noted that if there is removed from the gas coming from the oxidative dechlorination zone, the quantity of chlorine necessary to effect the reoxidation, a state of equilibrium is reached very quickly in which the chlorine content of the gas products is decidedly higher than that of the preceding case. In spite of the removal which is effected from the gases coming from the dechlorination zone, the quantity of chlorine contained in the gases coming from the installation remains constant and the concentration of the chlorine is increased as soon as the state of equilibrium is reached and as long as the gas coming from the reoxidation chamber is free from chlorine.

In practice, use is made of an installation containing two oxidation chambers as described above, and the feed is conducted to the upper chamber, or zone, that is to say, the reoxidation zone while permitting to enter from the lower zone by the connecting tube a part of the gas from the lower zone, i.e. the oxidative dechlorination zone. The supply of the gas is adjusted so that the quantity of chlorine entering the reoxidation zone is just sufficient for effecting the reoxidation and so that the gas leaving this zone is free from chlorine.

There is thus established in the interior of the installation a chlorine shift permitting the reoxidation of the salts.

It is possible in this manner to produce gases containing a highly increased content of chlorine.

In the table given below are shown the results of several experiments illustrating the improved process disclosed herein, and illustrated schematically in the annexed drawing. It is understood, however, that the process is not limited to the specific reactants shown, nor to the particular amounts thereof, nor to the particular operation conditions shown, which are merely for the purpose of illustrating the claimed invention.

An installation suitable for the manufacture of chlorine from hydrogen chloride and/or ammonium chloride comprises four superimposed reaction chambers through which pass successively and continuously granular contact masses comprising a suitable inert material such as diatomaceous earth, impregnated with ferric chloride, potassium chloride, and copper chloride so that their average composition is:

1.54 at gr. of iron per kgr. of oxidized mass
0.32 at gr. of copper per kgr. of oxidized mass
1.60 at gr. of potassium per kgr. of oxidized mass These reactant masses circulate successively through the reduction chamber 1, chlorination chamber 2, reoxidation chamber 3, and the dechlorination chamber 4. These four chambers are connected to each other by connection tubes 5, 6, and 7 permitting the descent of the granular masses successively through the four chambers. The granules are recovered at the exit 8 of the dechlorination chamber, by an elevator system not shown, and reintroduced into the reduction chamber.

Combustible gas, composed principally of methane, is introduced into the upper part of this last chamber and circulates there in parallel to the flow of the granular masses.

Hydrogen chloride or vapors of ammonium chloride are injected into the lower part of the chlorination chamber and circulate in the latter counter-current to the flow of the reduced granules to be converted to chlorides.

The reoxidation chamber 3 is provided with an entrance conduit 9 and an exit conduit 10 for the oxidant gas circulating counter-current to the flow of the granules.

The dechlorination chamber is provided with similar conduits 11 and 12.

The following table shows the operating conditions used in a number of experiments carried out to illustrate the second modification of the invention, the gas introduced into the reoxidation zone being dilue chlorine coming from the dechlorination chamber and entering by the connecting pipe separating these two zones.

Experiments Nos. 1, 3 and 5 illustrate the operating conditions for an installation comprising only three chambers, the oxidation being effected in a single step, according to a method different from the claimed invention.

TABLE

| No. of experiment | Flow of masses, kgr./h. | Reduction | | | Chlorination | | |
|---|---|---|---|---|---|---|---|
| | | Temperature, °C. | Flow of combustile gases, m.³/h. | "Redox" of the masses at gr./kgr.[1] | Temperature, °C. | Flow NH₄Cl, kgr./h. | "Redox" of the masses at gr./kgr.[1] |
| 1 | 640 | 480 | 22 | 1.0 | 480 | 55 | 1.20 |
| 2 | 700 | 480 | 20 | 0.8 | 490 | 60 | 1.1 |
| 3 | 560 | 470 | 15.5 | 0.75 | 480 | 60 | 1.1 |
| 4 | 560 | 470 | 15.5 | 0.75 | 480 | 60 | 1.1 |
| 5[2] | 750 | 475 | 24 | 0.90 | 480 | 65 | 1.15 |
| 6[2] | 700 | 480 | 20 | 0.8 | 490 | 60 | 1.1 |

| No. of experiment | Reoxidation | | | | Dechlorination | | | |
|---|---|---|---|---|---|---|---|---|
| | Temperature, °C. | Flow of entering gases, l./h. | Cl₂ in outgoing gases, percent | "Redox" of the masses at gr./kgr.[1] | Temperature, °C. | Flow of entering air, m.³/h. | Cl₂ in outgoing gas, percent | "Redox" of the masses at gr./kgr.[1] |
| 1 | | | | | 560 | 70 | 10 | 0.05 |
| 2 | 510 | 20 | 0 | 0.1 | 560 | 90 | 16 | 0.05 |
| 3 | | | | | 560 | 60 | 14 | |
| 4 | 500 | 18 | 0 | 0.1 | 550 | 60 | 22 | |
| 5[2] | | | | | 550 | 95 | 20 | |
| 6[2] | 510 | 20 | 0 | 0.1 | 550 | 90 | 25 | |

[1] "Redox" indicates the ratio between the quantity of hydrogen which would be consumed by treating the masses in their original state and the quantity of hydrogen necessary for the reduction of Fe₂O₃ to Fe₃O₄, and CuO.CuCl₂ to CuCl. "Redox" of 0 indicates masses in the oxide state, a "redox" of about 1, reduced masses.

[2] Values taken in the axial zone of the mobile beds.

It can be concluded from the experimental results given in the above table that oxidation in two stages increased the chlorine content of the gaseous products by about 5%.

What is claimed:

1. In a process for the manufacture of chlorine from a chloride selected from the group consisting of hydrogen chloride and ammonium chloride by contacting said chloride with a moving bed of a reactant mass comprising an inert granular support impregnated with a material selected from the group consisting of chlorides and oxides of iron; a reaction promoter selected from the group consisting of the chlorides and oxides of cadmium and copper; and an alkali chloride, said reaction masses falling by gravity through superimposed reaction zones in which is effected successively reduction, chlorination, and oxidation of said reactant masses, the improvement which comprises effecting the oxidation of the reactant masses in two steps comprising first re-oxidizing the said impregnated metals to their state of highest valence using approximately one-third of the total quantity of oxygen required for the complete oxidation operation and then subjecting said reactant mass to an oxidative dechlorination to liberate chlorine using approximately two-thirds of the total quantity of oxygen required for the complete oxidation operation.

2. Process according to claim 1, wherein the two oxidation steps are effected in separate reaction chambers.

3. Process according to claim 1, wherein the oxidation agent employed for the two oxidation stages is an oxygen-containing gas.

4. Process according to claim 1, wherein the oxidative dechlorination step is effected by means of a portion of an oxygen-containing gas, while the reoxidation step is effected by means of the chlorinated gases from the oxidative dechlorination step.

References Cited

UNITED STATES PATENTS

| | | | |
|---|---|---|---|
| 1,917,231 | 7/1933 | Bacon et al. | 23—87 |
| 1,938,461 | 12/1933 | Prutton | 23—87 |
| 2,577,808 | 12/1951 | Pye et al. | 23—219 |
| 2,642,339 | 6/1953 | Sawyer | 23—200 |
| 2,665,191 | 1/1954 | Graham et al. | 23—87 |
| 2,779,662 | 1/1957 | Frey | 23—202 |
| 3,103,419 | 9/1963 | Hunter et al. | 23—219 |
| 3,218,122 | 11/1965 | Nelson et al. | 23—219 X |

OSCAR R. VERTIZ, *Primary Examiner.*

EDWARD STERN, *Examiner.*